INVENTOR.
BILLY D. CHESTNUT
BY John B. Dickman III
AGENT.

United States Patent Office 3,344,551
Patented Oct. 3, 1967

3,344,551
FISHERMAN'S ACCESSORY
Billy D. Chestnut, R.F.D. 1, Magnolia, N.C. 28453
Filed Dec. 18, 1964, Ser. No. 419,349
4 Claims (Cl. 43—55)

ABSTRACT OF THE DISCLOSURE

A fishing device having a ground inserted stick for supporting a fishing rod holder and a combination bait box and cutting board, said cutting board forming the bottom of the bait box.

---

The present invention generally relates to a fishing device and more particularly to such a device which is adapted to be inserted into the sand of a beach or into the bank of any body of water.

An object of the present invention is to provide a fishing device having an elongated pointed stick in the shape of a walking cane for insertion into the beach or bank together with a holder for a fishing rod for supporting the rod in fishing position without requiring manual holding of the rod.

A further object of the present invention is to provide a fishing appliance that includes a readily accessible bait box supported on the supporting stick.

Another object of this invention is to provide a fishing device having a bait cutting board associated with the bait box.

Still a further object of this invention is to provide a fishing device having towel hooks associated with the bait box to facilitate storage of a hand towel in accessible position.

Still another important object of the present invention is to provide a fishing device in accordance with the preceding objects which is simple in construction, easy to use, long lasting, and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
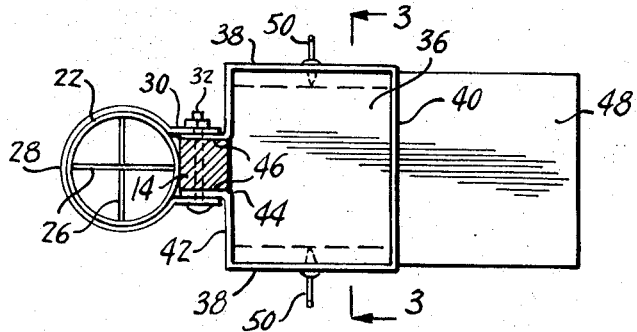
FIGURE 2 is a top plan sectional view, on an enlarged scale, taken along section line 2—2 of FIGURE 1.
Figure 3:
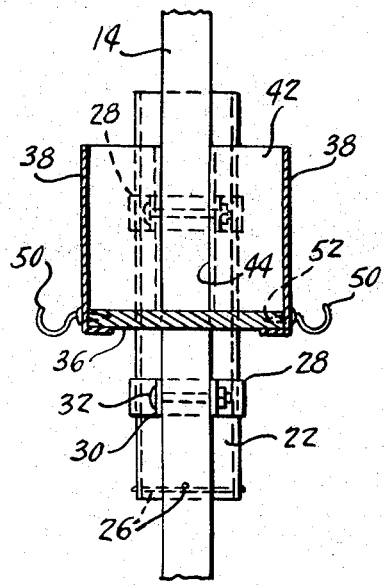
FIGURE 3 is a vertical sectional view taken along section line 3—3 of FIGURE 2 illustrating the structure of the bait box.
Figure 1:
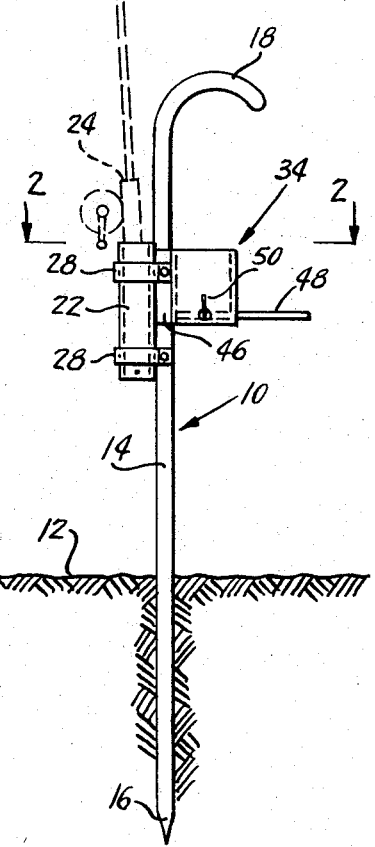
FIGURE 1 is a side elevation of the fishing device of the present invention illustrating the structural features thereof.

Referring now particularly to the drawings, the fishing device 10 is disclosed as being inserted into the sand 12 of a beach or the like although it can be inserted into the bank of a river, stream, lake or wherever desired.

The device 10 includes an elongated rod or stick 14 having a pointed lower end 16 and a hook-shaped upper end 18 thus defining a support having the configuration of a walking cane and which may serve as such in some instances such as when an ankle or leg injury is incurred while fishing.

Attached to an intermediate portion of the rod 14 is an upwardly opening tubular cylindrical socket 22 adapted to receive a substantial portion of the butt end of a fishing rod and reel assembly 24 of conventional construction thus holding the assembly 24 in proper position for surf fishing. The bottom of the socket or sleeve 22 is formed by a pair of crossed rods or wires 26 to enable water to drain out of the socket 22. A pair of split clamps 28 extend around the major portion of the socket or sleeve 22 and have end portions 30 extending transversely across the side surfaces of rod 14 and being secured thereto by fastening bolts 32 as illustrated in FIGURE 2.

A bait box 34 is attached to the rod 14 opposite from the holder 22 and includes a bottom 36, side walls 38, an outer wall 40 and an inner wall 42 orientated to form an open-topped parallelepiped box. The inner wall 42 has a slot-like opening 44 defined by a pair of spaced laterally extending vertical flanges 46 engaging opposites sides of the rod 14 in underlying relation to the end portions 30 of the clamps 28 and being fixedly secured in place by the fastener bolts 32. Also, the bottom edges of the side walls 38 turn under the edges of the bottom 36 for retaining the bottom 36 in place with the inner edge abutting the surface of the inner wall 42.

The bottom 36 also extends horizontally outwardly under the lower edge of the outer wall 40 with the wall 40 generally bisecting the length of the bottom 36 and with the outer portion of the bottom defining a cutting board 48 to enable the bait to be easily cut up for use. The cutting board 48 and bottom 36 actually are one and the same piece of wood which facilitates the cutting operation and at the same time retains moisture in the bait box or cup 34.

Extending laterally from opposite sides of the bait box 34 is a pair of hooks 50 for supporting hand towels or the like to enable the hands to be wiped. The hooks 50 have pointed fastening projections 52 which secure the side walls 38 and bottom 36 together.

When using the invention, the fishing rod and bait are held in readily accessible position and the bait may be easily cut up and placed on the hook thus facilitating the fishing operation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a fishing device of the type comprising a ground engaging rod and a fishing rod holder attached thereon, a combined bait box and cutting board attached to said ground engaging rod, said bait box comprising outer, side and inner walls, a portion of said cutting board disposed beneath said bait box and constituting the bottom wall thereof, the other portion extending outwardly from said bait box whereby said cutting board acts as a bottom for said bait box as well as functioning as a cutting board for bait.

2. The device of claim 1 in which the lower edges of the side walls of said bait box are longer than the outer and inner walls and extend downwardly and under the portion of the cutting board forming the bottom of said bait box.

3. The device of claim 2 in which the sides of the bait box are held to the portion of said cutting board forming the bottom of said bait box by fastening projections on towel hooks passing through said sides and engaging said bottom.

4. The device of claim 3 in which the inner wall of said box has a slot-like opening defined by a pair of spaced, laterally extending vertical flanges, said flanges engaging opposite sides of the rod and being secured thereto by a bolt passing through said flanges and said rod.

References Cited

UNITED STATES PATENTS

| | | | |
|---|---|---|---|
| 1,515,078 | 11/1924 | Shee | 248—156 X |
| 1,654,876 | 1/1928 | Hemming | 43—21.2 X |
| 1,857,072 | 5/1932 | Wilson | 43—55 |
| 2,520,450 | 8/1950 | Austin | 248—156 X |
| 2,877,828 | 3/1959 | Barnette | 248—38 X |
| 2,903,814 | 9/1959 | Greer | 43—55 |
| 3,159,366 | 12/1964 | Knight | 43—21.2 X |

FOREIGN PATENTS

| | | |
|---|---|---|
| 1,088,975 | 9/1954 | France. |
| 1,114,248 | 12/1955 | France. |

SAMUEL KOREN, *Primary Examiner.*

WARNER H. CAMP, *Examiner.*